United States Patent [19]

Thomas

[11] 4,135,137
[45] Jan. 16, 1979

[54] MAGNETIC POSITION DETECTORS

[75] Inventor: Gilbert Thomas, Saint Cloud, France

[73] Assignee: Societe Anonyme dite: Petrole Service, France

[21] Appl. No.: 777,411

[22] Filed: Mar. 14, 1977

[30] Foreign Application Priority Data

Mar. 23, 1976 [FR] France .................................. 76 08403

[51] Int. Cl.² ............................................ G01F 23/00
[52] U.S. Cl. .................................... 335/206; 200/84 C
[58] Field of Search ....................... 335/205, 206, 207; 200/84 C; 73/313

[56] References Cited

U.S. PATENT DOCUMENTS

| 3,627,959 | 12/1971 | Chapell | 335/205 X |
| 3,824,512 | 7/1974 | Glass | 335/205 |
| 3,826,139 | 7/1974 | Bachman | 73/313 X |
| 3,855,559 | 12/1974 | Lenseigne | 335/207 |

Primary Examiner—R. N. Envall, Jr.
Attorney, Agent, or Firm—James & Franklin

[57] ABSTRACT

A magnetic detection device for detecting the position of a movable member which is associated with a piece of magnetic material, the movable member being displaceable in a non-magnetic tube. A detection unit fixed outside the tube and including a permanent magnet with pole pieces directed towards the tube and extended portions extending away from the tube. The extended portions may be either in a plane parallel to or perpendicular to the axis of the tube. A dry reed relay is fixed relative to the pole piece with its ends facing the extended portions remote from the magnet. The extended portions may extend from opposite sides of the tube in which case the extended portions are perpendicular to the axis of the tube and the axis of the reed relay has a normal parallel to the axis of the tube. Alternatively, the reed relay is disposed parallel to the axis of the tube in which case the pole pieces are disposed on the same side of the tube. Alternatively, for detecting the direction of displacement, two double detection units are provided in superposed relation with their magnets in repelling relation.

5 Claims, 5 Drawing Figures

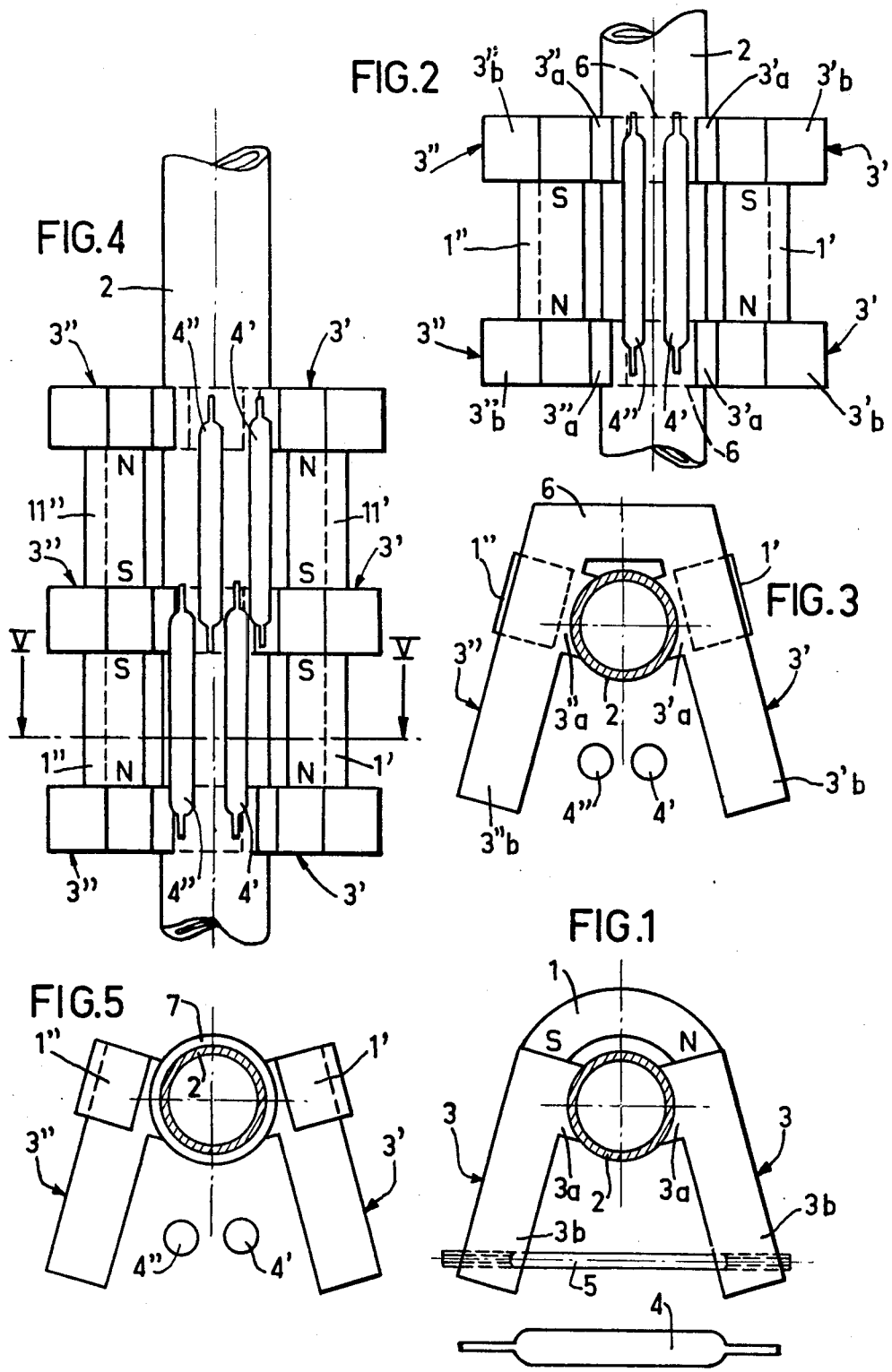

MAGNETIC POSITION DETECTORS

In U.S. patent Ser. No. 3,855,559, issued on Dec. 17, 1974 and entitled "Magnetic position detectors, notably level detectors", there was described a magnetic detection device for detecting the position of a movable member comprising a piece of magnetic material associated for movement with the movable member and displaceable inside a tube of non-magnetic material, and at least one detector unit disposed fixed with respect to the tube and outside thereof and including a permanent magnet the poles of which are extended by soft iron pole pieces directed towards and to each side of the tube, and a reed relay having flexible blades and disposed proximate to the magnet.

The object of the present invention is to provide improved performance in such a magnetic detection device by giving the device, for a given field strength of the magnet, contact actuation of the flexible reed contacts which is substantially sharper, more dependable and less subject to disturbances caused by impacts and vibrations.

To this end, and according to the invention, a magnetic detection device is provided for detecting the position of a movable member, comprising a piece of magnetic material associated for displacement with the movable member and capable of displacement inside a tube of non-magnetic material, and at least one detection unit fixed relative to and outside the tube including a permanent magnet extended by pole pieces towards the tube, and a magnetic responsive switch means fixed proximate to the magnet, wherein the improvement comprises: the pole pieces having extended portions located substantially in a plane parallel to or perpendicular to the axis of said tube, the ends of the extended portions facing the ends of the magnetic responsive switch means.

According to a particular embodiment of the invention, the permanent magnet is curved and partially surrounds the tube, the extended portions being located opposite the magnet with respect to the tube, said magnetic responsive switch means being a dry reed relay disposed substantially perpendicular to the axis of the tube.

According to another particular embodiment of the invention, the magnet is disposed parallel to the axis of the tube and the extended portions are parallel and on the same side of the tube, the reed relay being arranged parallel to the axis of the tube.

Preferably, in the case of the latter embodiment, two identical detection units are mounted symmetrically one on each side of the tube connected together by suitable means. These means may be formed as part of a single body including the pole pieces facing each other on opposite sides of the tube. Alternatively, these means may comprise the fastening of the pole pieces on opposite sides of the tube to a sleeve of magnetic material surrounding the tube and fixed thereto.

Finally, in case not only the passing of the movable member is to be detected but also the direction of displacement, two double detection units may be provided in which the magnets of each double detection unit are arranged in repelling relation.

Other advantages and features of the invention will become apparent from the following description of preferred embodiments of the invention, given merely by way of example with reference to the accompanying drawing, in which:

FIG. 1 shows a top plan view of a detection device according to a first embodiment of the invention;

FIG. 2 shows a side elevational view of another embodiment;

FIG. 3 shows a top plan view of the detection device illustrated in FIG. 2;

FIG. 4 shows an elevational view of a third embodiment; and

FIG. 5 shows a sectional view taken on the line V—V in FIG. 4.

In the embodiment of the invention illustrated in FIG. 1 a curved permanent magnetic 1 extends around part of the periphery of the tube 2 of non-magnetic material, a magnetic piece (not shown) fixed for movement with the movable member, e.g. a liquid level responsive float, to be monitored is displaceable inside the tube 2.

The ends of the magnet 1 are welded or otherwise bonded to a corresponding pole piece 3, for example of soft iron, mirror images of each other and disposed symmetrically, one on each side of the tube, in a plane substantially perpendicular to the axis of the tube.

The pole pieces 3 each have a portion 3a directed towards the tube 2 and an extended portion 3b located on the side of the tube opposite the magnet 1. The ends of the extended portions 3b are located facing the ends of magnetic responsive switch means which comprises a dry reed relay, the reed relay being disposed substantially perpendicular to the axis of the tube (means for fastening the reed relay to the tube not being illustrated).

The detection unit may be secured to the tube 2 by a bolt or tie rod, shown schematically in 5, clamping the pole pieces 3 against the tube 2 at the desired axial position along the latter.

When the magnetic piece displaceable inside the tube 2 reaches the height of the portions 3a, this causes a shunting of the magnetic flux in the pole pieces, as will being readily understood. Thereafter a considerable drop in the magnetic field through the extended portions 3b and the switch 4 will be produced. This very large and sharp change assures the reliable and dependable actuation of the reed switch 4. The actuation of the reed switch 4 may cause either the opening or closing of a controlled circuit connected to the reed relay.

In the embodiments of FIGS. 2 and 3 two detection units, i.e. a double detection unit, are provided, each a mirror image of the other and disposed symmetrically one on each side of the tube 2.

Each of the two detection units comprises a permanent magnet 1', 1" the axis of which are parallel to the axis of the tube 2. The magnet 1', 1" has, extending from its poles, pole pieces 3', 3" which are identical to the pole pieces 3 of the embodiment in FIG. 1, welded or otherwise bonded to the magnet.

The pole pieces 3' and 3" of the detection units located opposite each other are connected by a bridge portion 6 so that the double detection unit, excepting the reed relays, forms a single body.

The pole pieces 3' and 3" have portions 3'a and 3"a which partially embrace the tube 2 and end portions 3'b and 3"b disposed opposite the ends of the two reed relays 4' and 4" arranged parallel to the tube and fixed by means (not shown).

The operation of the double detection device unit is in all ways similar to that of FIG. 1. When the magnetic piece displaceable inside the tube 2 reaches the height of the pole pieces 3'a and 3"a, the magnetic flux through the portions 3'a and 3'b and the reed relay 4' as well as the 3"a and 3"b and the reed relay 4" drop abruptly following the shunting of the flux caused by the magnetic piece which is at the height of the portions 3'a and 3"a.

In the above described embodiment both reed relays 4' and 4" operate simultaneously and independently of each other such that the double detection unit could in fact employ a single reed relay.

FIGS. 4 and 5 illustrate a modification of the detection device for detecting the direction of the displacement of the magnetic piece inside the tube 2:

The device in FIGS. 4 and 5 comprises two double detection units such as shown in FIGS. 2 and 3 mounted with their permanent magnets 1', 1" and 11' and 11" in superposed repelling relation.

The pole pieces 3' and 3" are identical to those of FIGS. 2 and 3 except for the fact that the bridge portion 6 is replaced by a sleeve 7 of magnetic material surrounding the tube 2 and fixed thereto.

This arrangement of two double detection units permits the detection of direction of displacement of the magnetic piece in the course of its displacement inside the tube 2, which magnetic piece will actuate the double detectors 1' and 1" or 11' and 11" depending on whether the magnetic piece is moving upwards or downwards.

The sleeves 7 are, for example, of ferromagnetic material or mild steel. Such a sleeve could, of course, be provided level with the portions 3a in the embodiment illustrated in FIG. 1 in place of the tie rod or bolt clamping arrangement.

Finally, it is understood that the invention is not limited to the illustrated embodiments disclosed herein; indeed, various modifications and variations may be employed without departing from the spirit and scope of the invention defined by the appended claims.

What is claimed is:

1. A magnetic detection device for detecting the position of a movable member, comprising a piece of magnetic material associated for movement with the movable member inside a tube member of non-magnetic material; a detector unit fixed relative to and outside said tube member including a permanent magnet oriented parallel to the axis of said tube member; a pair of pole pieces and magnetic response switch means, comprising a read switch disposed parallel to the axis of said tube member; said magnet being connected between said pole pieces and operatively contacting each at a contact point thereon, each of said pole pieces having a first section, situated between said contact point and said tube member, and a second section substantially perpendicular to said first section, extending from said contact point in the general direction of said switch means, said extended portions of said pole pieces being substantially parallel to each other, said switch means being positioned facing said extended portions of said pole pieces at a location remote from said permanent magnet.

2. A device according to claim 1, wherein another said detection unit is mounted symmetrically to said detection unit with respect to the axis of said tube member, and means connecting said detection units together so as to constitute a double detection unit.

3. A device according to claim 1, wherein said connecting means connecting said detection unit comprises a bridge portion connecting corresponding pole pieces of said detection units.

4. A device according to claim 1, wherein said connecting means comprises a sleeve of magnetic material surrounding said tube and fixed thereto.

5. A device according to claim 4, further comprising another said double detection unit in superposed relation with respect to said double detection unit, said magnets of said double detection units being in repelling relation, and wherein said pole pieces of said first mentioned double detection unit adjacent said other detection unit defining said pole pieces of said other double detection unit adjacent said first mentioned double detection unit.

* * * * *